United States Patent [19]
Linehan et al.

[11] Patent Number: 5,770,172
[45] Date of Patent: Jun. 23, 1998

[54] PROCESS OF FORMING COMPOUNDS USING REVERSE MICELLE OR REVERSE MICROEMULSION SYSTEMS

[75] Inventors: John C. Linehan; John L. Fulton; Roger M. Bean, all of Richland, Wash.

[73] Assignee: Battelle Memorial Institute, Richland, Wash.

[21] Appl. No.: 725,840

[22] Filed: Oct. 4, 1996

Related U.S. Application Data

[63] Continuation of Ser. No. 310,882, Sep. 22, 1994, abandoned, which is a continuation of Ser. No. 821,765, Jan. 15, 1992, abandoned.

[51] Int. Cl.$^6$ .......................... C01G 49/02; C01G 49/06; C01G 49/08
[52] U.S. Cl. ...................... 423/561.1; 208/420; 252/309; 252/314; 423/558; 423/566; 423/633; 423/634; 502/338
[58] Field of Search ..................... 252/183.12, 183.14, 252/309, 314, 62.56; 423/633, 634, 558, 561.1, 566

[56] References Cited

U.S. PATENT DOCUMENTS

| | | | |
|---|---|---|---|
| 3,654,161 | 4/1972 | Geus .................................... | 252/62.56 |
| 3,676,362 | 7/1972 | Yates ..................................... | 252/309 |
| 3,969,265 | 7/1976 | Singhal et al. ...................... | 252/309 X |
| 4,172,814 | 10/1979 | Moll et al. .............................. | 208/108 |
| 4,360,448 | 11/1982 | Li et al. .................................. | 252/309 |
| 4,495,306 | 1/1985 | Budahn et al. ........................ | 502/185 |
| 4,595,512 | 6/1986 | Tellier et al. ......................... | 252/309 X |
| 4,933,404 | 6/1990 | Beckman et al. ...................... | 526/207 |
| 4,946,623 | 8/1990 | Tabony ................................... | 252/314 |
| 5,035,876 | 7/1991 | Castellano ........................... | 252/309 X |
| 5,238,671 | 8/1993 | Matson et al. .......................... | 423/397 |

FOREIGN PATENT DOCUMENTS

| | | | |
|---|---|---|---|
| 304243 | 2/1989 | European Pat. Off. .......... | C01F 7/02 |
| 3212389 A1 | 4/1982 | Germany . | |
| 0 304 243 | 2/1989 | Germany .......................... | C01F 7/02 |
| WO92/21611 | 12/1992 | WIPO . | |

OTHER PUBLICATIONS

*Synthesis of Nanosize Particles in Reverse Microemulsions* (1991) K. Osseo–Asare and F.J. Arriagada, Department of Materials Science and Engineering, The Pennsylvania State University, University Park, PA 16802.

R. Van Hardeveld and R. Hartog, Statistics of Surface Atoms and Surface Sites on Metal Crystals, Surface Sci., 15 (1969) 189–230.

M.Boudart, Catalysis by Supported Metals, Adv. Catal. Relat. Subject 20 (1969) 153–166.

K. Miki, Y. Yamamoto, A. Inaba and Y. Sato, *Liquefaction of Subbituminous Coal in the Presence of Dispersed Iron and Molybdenum Catalysts*, presented at the National Research Institute for Pollution and Resoruces, pp. 675–678.

Toshimitsu Suzuki, Hiroshi Yamada, Keishi Yunoki and Hiromitu Yamaguchi, Highly Active Catalyst of Coal Liquefaction; Proceedings 1991 International Conference on Coal Science, pp. 703–706.

X–X Bi. F.J. Derbyshire, P.C. Eklund, GT Hager and J.M. Stencel: *Coal Dissolution Promoted by Ultrafine Iron–Based Catalysts*, Presented at the 19091 International Conference onCoal Science in Newcastle,UK, pp. 683–686.

E. Klavetter, A. Sylwester, J. Wilcoxon, P. Nigrey, C. Snape, C. Lafferty, S. Mitchell; *Novel Dispersed Catalyst for Fixed–Bed Hydropyrolysis of Coal;* presented at the 1991 International conference on Coal Science, pp. 699–702.

T. Towey, Abid Khan–Lodhi and Brian H. Robinson; Kinetics and Mechanism of Formation of Quantum–sized Cadmium Sulphide Particles in Water–Aerosol–OT–Oil Microemulsions; Chem. Soc. Faraday Trans, 86, 1990, pp. 3757–3759.

J. B. Nagy, A. Gorgue and E.G. Derouane; *Preparation of Monodispersed Nickel Boride Catalysts using Reverse Micellar Systems;* vol. 3, eds. G. Poncelet, et al. (Elsevier, Amsterdam) 1983, pp. 193–203.

J. Wilcoxon and Rod Williamson; Formation of Metal Colloids in Inverse Micelles and Microemulsions; Mat. Res. Soc. Symp, Proc. vol. 177, 1990, pp. 269–273.

J. Wilcoxon, R.J. Baughmann, and R.L. Williamson; Formation of Catalysts in Inverse Micelles, Mat.Res. Soc, Exteneded Abstract 9EA—24) 1990 Materials Research Society, pp. 226–227.

M.L. Steiterwald, A.P. Alivisatos, J.M. Gibson, T.D. Harris, R. Kortan, A.J. Muller, A.M. Thayer, T.M. Duncan,D.C. Douglas, and L.E. Brus; Surface Derivatization and Isolation of Semiconductor Cluster Molecules; Am. Chem. Soc. vol. 110, pp. 3046–3050. (1988).

A. R. Kortan, R. Hull, R.L. Opila, M.G. Bawendi, M.L. Steigerwald, P.J. Carroll, and L./E. Brus; Nucleation and Gropwth and CdSe on ZnS Quantum Crystallite Seeds, and Vice Versa, in Inverse Micelle Media, Am. Chem. Soc. vol. 112, pp. 1327–1332. (1990).

*Primary Examiner*—Richard D. Lovering
*Attorney, Agent, or Firm*—Paul W. Zimmerman

[57] ABSTRACT

The present invention is directed to a process for producing a nanometer-sized metal compound. The process comprises forming a reverse micelle or reverse microemulsion system comprising a polar fluid in a non-polar or low-polarity fluid. A first reactant comprising a multi-component, water-soluble metal compound is introduced into the polar fluid in a non-polar or low-polarity fluid. This first reactant can be introduced into the reverse micelle or reverse microemulsion system during formation thereof or subsequent to the formation of the reverse micelle or microemulsion system. The water-soluble metal compound is then reacted in the reverse micelle or reverse microemulsion system to form the nanometer-sized metal compound. The nanometer-sized metal compound is then precipitated from the reverse micelle or reverse microemulsion system.

42 Claims, No Drawings

PROCESS OF FORMING COMPOUNDS USING REVERSE MICELLE OR REVERSE MICROEMULSION SYSTEMS

This application is a continuation of Ser. No. 08/310,882 filed Sep. 22, 1994 now abandoned which is a continuation of Ser. No. 07/821,765 filed Jan. 15, 1992, now abandoned.

BACKGROUND OF THE INVENTION

This invention was made with United States Government support, and the Government has rights therein under Contract No. DE-AC06-76RLO 1830 with the Department of Energy.

Transportation fluids derived from coal are potentially important fuels in our immediate future. However, the high current costs associated with the processing of these fuels make them economically unattractive at the present time. Development of the capacity to produce catalysts having lower initial costs and/or improved catalytic efficiency than those currently in use would be a major step toward increasing the economic viability of coal-derived liquid fuels. One approach for improving catalytic efficiency in coal conversion processes is to use catalysts having particle sizes on the nanometer size scale. See R. Van Hardeveld and R. Hartog, Statistics of surface atoms and surface sites on metal crystals, Surface Sci., 15 (1969) 189–230. Smaller catalyst particle size allows for an increased surface area and expands the number of coordination sites available per gram of catalyst. This may contribute to improved selectivity in coal conversion processes since, for example, C—C hydrogenolysis reactions apparently require coordination on catalytic surfaces whereas hydrocarbon hydrogenation reactions do not. M. Boudart, Catalysis by supported metals, Adv. Catal. Relat. Subj., 20 (1969) 153–166. Use of ultrafine particles also increases the potential for mobility of the catalyst particle, allowing greater access to the coal surface.

In a paper entitled "Liquefaction Of Subbituminous Coal In The Presence Of Dispersed Iron And Molybdenum Catalysts", written by K. Miki, et al, and presented at the National Research Institute for Pollution and Resources, pages 675–678, ground bituminous coal was liquified using iron oxide and molybdenum dioxyacetylacetone. Suzuki, et al, discuss Ru complex catalysts for coal liquefaction. The Suzuki article is entitled "Highly Active Catalyst of Coal Liquefaction", and appears on pages 703–706 of the *Proceedings: 1991 International Conference on Coal Science*. A paper relating to coal liquefaction by ultrafine Fe-based catalysts is "Coal Dissolution Promoted By Ultrafine Iron-Based Catalysts" written by X—X Bi, et al. This paper was presented at the 1991 International Conference on Coal Science in Newcastle, UK. In another paper given at the same conference, catalysts comprising sulfated Mo, Mo—and Pd-HTO's, and Pd metal colloids dispersed in toluene or octane serve as catalysts for fixed-bed hydropyrolysis of coal. see Novel Dispersed Catalysts for Fixed-Bed Hydropyrolysis of Coal, by E. Klavetter, et al, p. 699–702, presented at the 1991 International Conference on Coal Science.

Reverse micelles and microemulsions are optically transparent, thermodynamically stable systems containing dispersed aqueous droplets stabilized in a continuous nonpolar medium by surfactant shells. The aqueous microdomains within the micelle core (2 to 20 nanometers in diameter) have solvent properties which depend on the molar water-to-surfactant ratio, W. At low W values (<10), the water in the core is highly structured due to association with the polar head group of the surfactant molecules. At higher W values, the swollen micelles (microemulsions) have a free water core with bulk water solvent characteristics. Reverse micelles and microemulsions can, in some respects, be visualized as submicroscopic aqueous reaction vessels into which water soluble species can be dissolved. Further, nanometer-scale particles produced in micelle or microemulsion systems likely have surface coatings of surfactant molecules, making them soluble in the continuous phase and inhibiting subsequent growth by interaction with other particles. In liquid phase studies microdroplets have been used recently as reaction media, utilizing the very small volumes to defeat nucleation and agglomeration processes to yield a finely divided solid product. see Towey, T. F. et al, J. Chem. Soc. Faraday Trans., 86, 1990, p. 3757; and Nagy, J. B., et al in: Preparation of Catalysts, Vol. 3, eds. G. Poncelet, et al (Elsevier, Amsterdam) 1983 p. 193. As described in U.S. Pat. No. 4,933,404 and U.S. Pat. No. 5,238,671, both of which are assigned to the assignee of this patent application, microemulsions formed in supercritical fluids can be used to form solid microparticles.

An article by Wilcoxon, et al, in Met. Res Symp. Proc., Vol. 177, p. 270–3, entitled "Formation of Metal Colloids in Inverse Micelles and Microemulsions", relates to the formation of homogeneous catalysts of elemental gold in the form of colloids form inverse micelle solutions and microemulsions using an $N_2H_4$ reducing agent. In another article by Wilcoxon, et al, entitled "Formation of Catalysts in Inverse Micelles", appearing in Mat. Res. Soc. Extended Abstract (EA-24), at pages 226 and 227, 1–10 nanometer-sized small colloidal inverse emulsion metal catalysts of Rh, Ni, NiB, $MoO_2$, Pd, Au, Ag and alloys thereof. The micelles/microemulsions were prepared using as solvents saturated hydrocarbons, cyclic hydrocarbons, aromatic hydrocarbons. Three classes of micelle systems were individually investigated, i.e., nonionic, anionic, and cationic. The anionic surfactant used in the anionic system was sodium-bis(2-ethylhexyl) sulfosuccinate (AOT), and the cationic surfactant used in the cationic system was didodecyldimethylammonium bromide (DDAB).

An article by Brus et al, in J. Am. Chem. Soc. Vol. 110, p 3046–3050, entitled "Surface Derivatization and Isolation of Semiconductor Cluster Molecules", describes the synthesis and characterization of CeSe, HgSe, CdTe and CdS semiconductor particles using reverse micelles. These particles could be "capped" with thiophenol and selenophenol to render the particles soluble in organic solvents. The particles were nanometer sized and were synthesized using AOT in heptane based reverse micelles. In another article by Brus et al, in J. Am. Chem. Soc., Vol 112, 1327–1332, entitled "Nucleation and Growth of CdSe on ZnS Quantum Crystallite Seeds, and Vice Versa, in Inverse Micelle Media", the process of producing ZnS and ZnSe particles is described as well as ZnS particles grown on CdSe and vice versa. The "capping" of these particles is also described. A paper by Robinson et al entitled "Kinetics and Mechanism of Formation of Quantum-sized Cadmium Sulphide Particles in Water-Aerosol-OT-Oil Microemulsions" in J. Chem. Soc. Faraday Trans, Vol 86, p. 3757–3762, describes the kinetics of cadmium sulfide particle growth inside of AOT based reverse micelles in various organic solvents including n-heptane, cyclohexane and n-decane. The temperature dependence of the particle growth was also investigated over a range 5° C. to 25° C. in this paper.

SUMMARY OF THE INVENTION

The present invention is directed to a process for producing a nanometer-sized metal compound. The process comprises forming a reverse micelle or reverse microemulsion system comprising a polar fluid in a non-polar or low-polarity fluid. A first reactant comprising a multi-component, water-soluble metal compound is introduced into the polar fluid in a non-polar or low-polarity fluid. This first reactant can be introduced into said reverse micelle or reverse microemulsion system during formation thereof or subsequent to the formation of the reverse micelle or microemulsion system. The multi-component, water-soluble metal compound is then reacted in the reverse micelle or reverse microemulsion system to form the nanometer-sized metal compound. The nanometer-sized metal compound is then precipitated from the reverse micelle or reverse microemulsion system. Preferably, the process further includes the step of incorporating the first reactant into the polar fluid for producing the nanometer-sized metal compound.

The subject process can include the further step of adding at least one additional reactant to the reverse micelle or reverse microemulsion system. The additional reactant interacts with the first reactant for producing a nanometer-sized metal compound. Preferably, the additional reactant is capable of diffusing into or out of the reverse micelles or reverse microemulsions for producing the nanometer-sized metal compound. The reverse micelles or reverse microemulsion preferably includes an aqueous fluid and at least one surfactant, and more preferably includes an aqueous fluid, a surfactant and a co-surfactant.

Some of the advantages of the use of reverse micelle or microemulsion technology, particularly for the production of inexpensive coal liquefaction catalysts, are as follows:
a. Synthesis is conducted at ambient temperature and pressure. This can reduce costs of preparation.
b. The size of the micelle, and therefore size of the particle formed in its core, is easily controlled by varying the water to surfactant ratio.
c. Inexpensive metal salts can be used as precursors.
d. Particles soluble in organic media can be produced using "capping" reagents, as hereinafter described.
e. Clean particles free from contaminants can be produced.
f. Ultrafine multi-metallic catalysts can be produced.

The foregoing and other objects, features and advantages of the invention will become more readily apparent from the following detailed description of a preferred embodiment of the invention.

DETAILED DESCRIPTION OF THE PREFERRED EMBODIMENTS

Reverse micelle and reverse microemulsion technology has been used to synthesize nanometer-sized metal compounds, particularly metal oxides, metal sulfides, and oxygen-containing metal sulfide compounds. The preferred metal for use in producing these compounds is iron. These nanometer-sized iron compounds show catalytic activity for carbon-carbon bond scission in model coal compounds under coal liquefaction conditions.

The subject process can produce nanometer-sized metal compounds in reverse micelles or reverse microemulsions which of the present invention which are stable therein, and are preferably stable for an extended period of time. The average particle size of the nanometer-sized metal compounds is preferably not more than about 20 n.m., more preferably not more than about 10 n.m., and most preferably not more than about 5 n.m. Furthermore, the actual particle size can be controlled within a predetermined average particle size range. These nanometer-sized metal compounds show better diffusion properties in aromatic melts than do conventional bulk catalysts of the same composition.

This process of the present invention comprises first forming a reverse micelle or reverse microemulsion system for use in producing nanometer-sized metal compounds. These reverse micelle or reverse microemulsion systems, which typically have a high degree of optical clarity, are comprised of polar fluid (aqueous or water phase) in a non-polar or low-polarity fluid (non-aqueous or oil phase). The polar fluid region surrounds the first reactant(s). This reactant(s) is located in the reverse micelles which are typically spherical or rod-like in configuration. The microemulsion system can also be in the form of a bi-continuous system comprised of a two-phase sponge-like network in which the non-polar of low-polarity fluid forms the sponge portion and the polar fluid forms the void area.

Typically, the polar fluid includes water and at least one surfactant. The surfactant can be of a type that has a polar end group and an oil-like end group. Although several types of surfactants such as cetyl trimethyl ammonium bromide (CTAB), dodecyl penta(oxyethylene) ether ($C12E_5$), or n-dodecyloctaoxyethylene glycol monoether ($C_{12}E_8$) can be used to form the reverse micelle or reverse microemulsion system, the surfactants of choice are anionic or cationic in nature. Aerosol AOT (anionic), i.e., sodium bis(2-ethyl hexyl) sulfosuccinate and DDAB (cationic), i.e., didodecyl-dimethylammonium bromide are the preferred specific surfactants. The primary surfactant can also include a co-surfactant to facilitate the formation and stability of the reverse micelle or reverse microemulsion systems. The co-surfactants are generally amphiphillic in nature. Sodium alkyl sulfates having from 8 to 20 carbon atoms, preferably SDS (sodium dodecyl sulfate), have proven to be the preferred co-surfactant.

The amount of surfactant and the amount of water which make up the aqueous phase are each preferably from about 1 to 30%, more preferably from about 2 to 20%, and most preferably 5 to 15%, by weight of the total weight of the reverse micelle or reverse microemulsion systems. The maximum total amount of the surfactant and water is preferably up to about 50%, more preferably up to 30%, and most preferably up to about 20%, by weight of the total weight of the reverse micelle or reverse microemulsion systems. The amount of co-surfactant is preferably up to about 75%, and more preferably up to about 50%, and most preferably up to about 25%, by weight of the total weight of primary surfactant in the total weight of the reverse micelle or reverse microemulsion systems.

The solvent portion of the reverse micelle or reverse microemulsion systems typically comprises a non-polar solvent. Non-polar solvents are generally defined as solvents having a small dipole moment (preferably D<1) and a small dielectric constant (preferably e<5). The solvent portion typically comprises aromatic hydrocarbons such as toluene, butylbenzene and benzene, cycloalkanes such a cyclohexane, chlorinated hydrocarbons such as carbon tetrachloride and methylene chloride, and alkanes having up to 20 carbon atoms, and preferably up to 16 carbon atoms, such as hexane, octane, decane, dodecane and hexadecane, and branched alkanes such as isooctane and dimethyl butane, or mixtures thereof.

After the reverse micelle or reverse microemulsion system is formed, a first reactant comprising a multi-component, water-soluble metal compound is dissolved into that system. Alternatively, the first reactant can be incorporated in the synthesis of the reverse micelle system. This latter approach is preferred.

The first reactant is incorporated into the polar fluid of the reverse micelle or reverse microemulsion for producing the nanometer-sized metal compound. The first reactant is generally a water-soluble sulfate, nitrate, halide, ammonium sulfate or oxalate compound, typically a water-soluble iron compound, such as an iron sulfate compound, an iron nitrate compound, or an iron ammonium sulfate compound. The preferred water-soluble iron compounds comprise $FeSO_4$, $FeCl_2$, $Fe(NH_4)_2(SO_4)_2$, $FeCl_3$, $Fe(C_2O_4)$, $Fe_2(C_2O_4)_3$, $Fe(NO_3)_2$, $Fe(NO_3)_3$, $Fe_2(SO_4)_3$ and $FeNH_4(SO_4)_2$, and their hydrates.

The first reactant can also comprise a multi-component, water-soluble Cu, Ni, Cr, Mn, Ti, Mo, Co, W compounds, or combinations thereof, such as $CuX_2$, $NiX_2$, $COX_2$, $CrX_3$, $MOX_3$ where X is Cl, Br, I, $ClO_4$, or $NO_3$, CuY, NiY, CoY where Y is $SO_4$, or $C_2O_4$. $M_2MoO_4$, $M_2CrO_4$, $M_2WCrO_4$ where M is $NH_4$, Li, Na, or K. These multi-component compounds can include $TiCl_3$, titanous acid, molybdic acid, tungstic acid, chromic acid, potassium permanganate and their hydrates.

The process of the present invention can also include the further step of introducing at least one additional reactant to the reverse micelle or reverse microemulsion system. In this way, the additional reactant(s) will react with the first reactant and thereby produce the nanometer-sized metal compound. The additional reactant can comprise an acidic material or a basic material for enhancing water-solubility of said first reactant. The preferred materials for use as the additional reactant can comprise $NH_3$, NaOH, $Na_2S$, $NH_4OH$, $O_2$, KOH, $H_2S$, $K_2S$, $CO_2$, $H_2CO_3$, $NaHCO_3$, $KHCO_3$, $Na_2CO_3$, $K_2CO_3$, HCl, $H_2SO_4$, $H_3PO_4$, $H_2NaPO_4$, $HNa_2PO_4$, $Na_3PO_4$, $HK_{2\ PO4}$, $H_2KPO_4$, $K_3PO_4$, $(NH_4)_2S$, hydrazine and its hydrates, $NaBH_4$.

The multi-component, water-soluble metal compound is then reacted in the reverse micelle or reverse microemulsion system to form the nanometer-sized metal compound. Once the reaction is completed, the nanometer-sized metal compound is precipitated from the reverse micelle or reverse microemulsion system. One way of precipitating the nanometer-sized metal compound is by removing water from the reverse micelles or reverse microemulsion systems. Another approach is by forming the nanometer-sized metal compound by raising or lowering the pH of said multi-component, water-soluble metal compound in the reverse micelle or reverse microemulsion system. Other approaches are to add a precipitating agent such as the reagents described above or by allowing the particles to grow or "ripen" until the reverse micelle or microemulsion can no longer contain the particles.

The process of the subject invention is conducted at up to a temperature that would destroy the ability of the surfactant to facilitate the formation of a reverse micelle or reverse microemulsion system, typically from a temperature as low as 5 degrees C. Other process conditions which affect the formation of the nanometer-sized metal compound are as follows: Oxygen, concentration of reactants, size of the reverse micelles or microemulsions, ionic strength of the aqueous phase, the pH of the aqueous phase, the identity of the surfactants, the identity of the organic phase, pressure, the identity of the reactants, rate of gas flow or rate of second reagent addition, total reaction time, the identity of the acid or base used, and stoichiometry of reactants.

In a further scenario, a nanometer-sized metal compound can be precipitated by introducing a capping reagent into said reverse micelle or reverse microemulsion system. This capping agent can comprise any of a primary sulfide, an alcohol, a thioalcohol, a phenol and a thiophenol. Specific capping agents can include thiophenol, octyl thiol, decyl thiol, hexyl thiol, heptyl thiol, dodecyl thiol, lauryl alcohol, methanol, propanol, butanol, octyl alcohol, phenol, 1-(trichlorosilyl) octadecane and iso-propylalcohol.

The process of this invention is directed to producing novel nanometer-sized metal compounds, particularly metal oxides, sulfides or oxysulfides. The preferred nanometer-sized metal compounds produced include $Fe(OH)_3$ beta-$Fe_2O_3$, gamma-$Fe_2O_3$, magnetite, maghemite, beta-FeOOH, gamma-FeOOH, alpha-FeOOH, alpha-$Fe_2O_3$, FeS, $Fe_2S_3$, FeOS, $NH_4FeS_2$, elemental iron or mixtures.

This invention is different from other techniques for forming ultra-small particles in reverse micelle and microemulsions. Wilcoxon described a method to produce elemental iron particles whereas Brus described a method to produce semiconductor materials. Specifically, this invention relates to methods for the formation of metallic multi-metallic compounds which may be used as catalysts in chemical reactions. This invention is also different from conventional methods of Wilcoxon and Brus in that the amount of the nanometer-sized product formed by process of the present invention is at least about 3 times the amount of nanometer-sized product, more preferably at least about 5 times the amount of nanometer-sized product, and most preferably at least about 8 times the amount of conventionally-produced nanometer-sized product.

This invention can also be employed in a process for producing coal-derived liquids. This process comprises forming a reverse micelle or reverse microemulsion system comprising a polar fluid in a non-polar or low-polarity fluid as described above. Then, a first reactant comprising a multi-component, water-soluble metal compound is introduced into the polar fluid in a non-polar or low-polarity fluid during the formation of said reverse micelle or reverse microemulsion system. Alternatively, the metal compound can be introduced into the reverse micelle or reverse microemulsion system subsequent to its formation of producing a nanometer-sized metal compound. A nanometer-sized metal compound is then formed in the reverse micelle or reverse microemulsion system. In the production of coal-derived liquids, a second reactant comprising a coal compound and a hydrogen-donating source is then provided. Finally, the second reactant and the reverse micelle or reverse microemulsion system containing said nanometer-sized metal compound are reacted to form a coal-derived liquid material. More specifically, the reaction step can be conducted by introducing the reverse micelle or reverse microemulsion system containing the nanometer-sized metal compound into a reactor containing the second reactant thereby forming said coal-derived liquid material. Alternatively, the reaction can be conducted by introducing the reverse micelle or reverse microemulsion system containing the nanometer-sized metal compound into the reactor containing said second reactant, and then conducting a coal liquefaction reaction.

Typical Reaction To Produce Metal-Containing Reverse Micelle Solution

A 1M solution of an aqueous iron compound, $FeNH_4(SO_4)_2$, 12 mL, is added to 3 g SDS in a 250 mL flask. The mixture is stirred for 5 to 10 minutes until a paste forms. The 0.12M AOT in isooctane solution, 150 mL, is added to the iron/SDS slurry and the mixture is stirred for 5 to 10 minutes. To speed up the formation of the reverse micellar solution the mixture may be heated. After the reverse micelle solution is formed the light orange solution is filtered to remove any insoluble impurities.

Formation of Nanometer-Sized Particles

A base such as ammonia, sodium hydroxide etc., is added to the homogeneous iron-containing reverse micelle or microemulsion solution described above. In one such method, ammonia is bubbled through the stirred iron-containing reverse micelle or microemulsion solution. At this point oxygen or air may also be bubbled through the solution to speed up the formation of the iron-oxide, or may be excluded to collect $Fe(OH)_3$. The ammonia (and air/oxygen) is bubbled until the iron-oxide is seen to form a precipitate, approximately 5 to 30 minutes depending upon flow rate of ammonia and oxygen content of reverse micelle solution. The crude iron-oxide is separated from the surfactants and solvents by centrifugation. The solid material collected is washed with isooctane, acetone, water, and methylene chloride to remove any traces of the surfactants and sodium sulfate and dried under vacuum. In this reaction up to 1.8 gram of iron oxide may be collected with more than 1 gram of clean dry product being typical.

Controlling Size of Particles

The size of the solid product produced is controlled, in one procedure, by the water-to-surfactant ratio, W. By adding more aqueous phase relative to the surfactant(s), the size of the reverse micelle will grow and thereby the maximum size of the material produced may also grow. A larger W will give larger product particles.

A second method of controlling particle size is by varying the amount of the metal ion in each reverse micelle. More metal ions in an individual reverse micelle will cause larger particles to grow because diffusion through the aqueous phase of the reverse micelle is similar to diffusion through a bulk aqueous phase. Fewer metal ions in each micelle will yield smaller sized products on a shorter time scale since the exchange of materials between micelles is much slower than bulk diffusion.

Another method of producing particles of different sizes from the reverse micelles is to decrease the exchange of materials between different micelles. Lowering the temperature, or slowing the agitation of the solution will slow the inter-micellar exchange of materials giving either smaller particles or the same sized particles over a longer time scale.

Variations To Typical Reaction

Once a homogeneous reverse micellar metal-containing solution, such as an iron containing solution, is formed, a sulfide of that metal compound can be formed by bubbling $H_2S$ gas through the metal-containing solution, or by any of the following methods: addition of aqueous $(NH_4)_2S$, solid $Na_2S$, aqueous solution of $Na_2S$, or a homogeneous reverse micellar solution of either $Na_2S$ or $(NH_4)_2S$ to the iron-containing solution. The stoichiometry of ferric sulfide, for example, may be controlled by controlling the ratio of the sulfide-to-iron.

To form mixed oxide/sulfide of iron the procedure for producing the iron-sulfide is followed in the presence of, or with the addition of air, oxygen or another oxidizing agent. The stoichiometry of the oxide-to-sulfide can be controlled by the ratio of sulfide-to-oxygen added. Alternatively the sulfide may be formed and then the wet solid ferric-sulfide may be exposed to air, oxygen or another oxidizing agent to produce the desired mixed sulfide/oxide of iron. Another method of producing a mixed sulfide/oxide of iron would be introduce a sulfating agent ie $H_2S$, $(NH4)_2S$, or $Na_2S$ to a slurry of the iron-oxide produced in the typical reaction.

To form a mixed metal species several methods may be followed. The two or more aqueous soluble multicomponent metal containing salts may be dissolved together in the aqueous phase before the formation of the reverse micelle or microemulsion. A second method is to produce separate reverse micellar or microemulsion phase for each multicomponent metal salt and then to mix the different metal containing reverse micelle or microemulsion solutions together. The formation of the multi-metal-oxide, sulfide or mixed oxy-sulfide would follow the typical reaction as described above. The stoichiometry of the different metals would be controlled by the ratio of the different metal species in the aqueous phase. Alternatively the metal stoichiometry could be controlled by the time and rate of addition of the second metal containing reverse micelle or microemulsion solution to the first. The time of the oxide or sulfide formation relative to the mixing of the multimetallic reverse micelle solutions could also be a variable used to control the identity of the final product produced.

For some systems the desired product may contain different components in separate layers. This can be achieved using reverse micelles or microemulsions by forming the first solid phase as per the typical reaction described above and then introducing a different reagent to form a second layer and a third, etc. For example, if a material which contains a metal oxide core surrounded by a nickel sulfide layer is desired, then the iron-oxide is produced as per the typical reaction but is stabilized in the reverse micelle by not allowing growth to a critical size and then a reverse micellar solution containing a aqueous soluble nickel salt is mixed with the iron-oxide particles. A sulfating agent, as described above, is then used to produce the nickel-sulfide layer upon the iron-oxide layer.

Catalyst Testing

The iron-oxide materials produced have been tested for catalytic activity using the coal model 2-naphthyl-4-bibenzyl methane. The testing procedure involves the use of a hydrogen donating solvent, 9,10-dihydrophenanthrene, the model compound and possibly a co-catalyst such as sulfur or another metal containing catalyst. In a typical reaction 25 mg of 2-naphthyl-4-bibenzyl methane, 100 mg of 9,10-dihydrophenanthrene, 2.5 mg of the reverse micelle produced catalyst and possibly 2.5 mg of sulfur are added to a 10 cm×5 mm id quartz or PYREX tube which is sealed at one end. The other end is flame sealed under vacuum after the materials are added. The test mixture may or may not be completely degassed before reaction. The sealed tube is immersed for one hour in a high temperature air agitated sand bath which is at 400° C. The tube is removed from the high temperature bath, cooled and opened. The contents are dissolved in a known amount of solvent, methylene chloride, which contains a known amount of GC, gas chromatography, standard. The dissolved samples are analyzed using standard GC and GC/MS, gas chromatography analyzed by mass spectroscopy, to determine the product distribution and conversions. A sample of these experimental results is shown in Table I.

Without a catalyst very little conversion of the starting model compound occurs, and there is no selectivity as to which carbon-carbon bond is broken. The proof of catalytic activity of the compounds described herein is the greater than 50% conversion and greater than 90% selectivity toward carbon-carbon bond A over any other bond. This bond has been calculated as being the hardest of the five bonds designated to thermally break.

TABLE I

Fine Particle Catalyst Evaluation
Using the Model Compound

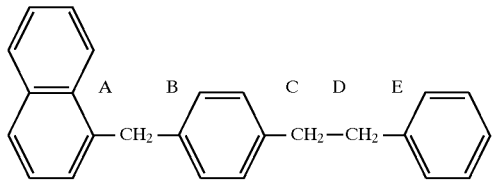

Naphthyl Bibenzylmethane (model compound)

| Catalyst | Size (nm) | Conversion (%) | Selectivity (A/A + D) |
|---|---|---|---|
| NONE | — | 2 | 43 |
| $Fe_2O_3$ + S | 1 | 51 | 91 |
| $Fe_2O_3$ + S | 7 | 67 | 92 |
| $Fe_2O_3$ + S | 1 | 70 | 94 |
| $Fe_2O_3$ + S | 8 | 77 | 89 |
| $Fe_2S_3$ | <10 | 68 | 96 |

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. A process of producing nanometer-sized particles of a metal oxide compound, comprising the steps of:
   forming a reverse micelle system or a bi-continuous system, or a reverse microemulsion system each comprising a polar fluid, a surfactant and a co-surfactant that is water soluble in a non-polar or low-polarity fluid;
   introducing a first reactant comprising a multi-component, water soluble metal compound into the polar fluid during the formation of said reverse micelle system or said bi-continuous system subsequent to its formation;
   reacting said multi-component, water soluble metal compound in said reverse micelle system or said bi-continuous system to form said nanometer sized particles of said nanometer-sized metal oxide compound, said nanometer sized particles having an average size not more than about 20 nm; and
   separating said nanometer-sized particles from said reverse micelle system or said bi-continuous system.

2. The process of claim 1, which includes the further step of adding at least one additional reactant to said reverse micelle or reverse microemulsion system, said additional reactant interacting with said first reactant for producing said nanometer-sized metal compound.

3. The process of claim 2, wherein said additional reactant is capable of diffusing into or out of said reverse micelles or reverse microemulsions for producing said nanometer-sized metal compound.

4. The process of claim 2, wherein an additional reactant is comprise NH3, NaOH, $Na_2S$, $NH_4OH$, $O_2$, KOH, $H_2S$, $K_2S$, $CO_2$, $H_2CO_3$, $NaHCO_3$, $KHCO_3$, $Na_2CO_3$, $K_2CO_3$, HCl, $H_2SO_4$, $H_3PO_4$, $H_2NaPO_4$, $HNa_2PO_4$, $Na_3PO_4$, $HK_2PO_4$, $H_2KPO_4$, $K_3PO_4$, or $(NH_4)_2S$, or combinations thereof.

5. The process of claim 2, wherein said additional reactant comprises one of an acidic material or a basic material for enhancing water-solubility of said first reactant.

6. The process of claim 1, which includes the step of incorporating said first reactant into said polar fluid for producing said nanometer-sized metal compound.

7. The process of claim 1, wherein said nanometer-sized metal compound comprises $Fe(OH)_3$, alpha-FeOOH, alpha-$Fe_2O_3$, beta-$Fe_2O_3$, gamma-$Fe_2O_3$, magnetite, maghemite, beta-FeOOH, gamma-FeOOH, FeS, $Fe_2S_3$, FeOS, $NH_4FeS_2$, or mixtures.

8. The process of claim 1, wherein said polar fluid is water.

9. The process of claim 8, wherein the amount of said surfactant and aqueous fluid which form the aqueous phase of said reverse micelles or reverse microemulsion are each from about 2 to 30% by weight, based on the total weight of said reverse micelles or reverse microemulsion.

10. The process of claim 1, wherein said surfactant comprises cetyl trimethyl ammonium bromide, dodecyl penta(oxyethylene) ether, n-dodecyloctaoxyethylene glycol monoether, sodium bis(2-ethyl hexyl) sulfosuccinate or didodecyl-dimethylammonium bromide.

11. The process of claim 1, wherein said co-surfactant comprises sodium alkyl sulfate having from 8 to 20 carbon atoms.

12. The process of claim 1, which further includes the step of forming said nanometer-sized metal compound by removing water from said reverse micelles or said reverse microemulsion.

13. The process of claim 1, which further includes the step of forming said nanometer-sized metal compound by raising or lowering the pH of said multi-component, water-soluble metal compound in said reverse micelle or reverse microemulsion system.

14. The process of claim 1, wherein said nanometer-sized metal compound is precipitated by introducing a capping reagent into said reverse micelle or reverse microemulsion system.

15. The process of claim 14, wherein said capping agent comprises any of a primary sulfide, an alcohol, a thioalcohol, a phenol or a thiophenol.

16. The process of claim 14, wherein said capping agent comprises any one of thiophenol, octyl thiol, decyl thiol, hexyl thiol, heptyl thiol, dodecyl thiol, lauryl alcohol, methanol, propanol, butanol, octyl alcohol, phenol, and iso-propylalcohol.

17. The process of claim 1, wherein said first reactant is a water-soluble sulfate, nitrate, halide, ammonium sulfate or oxalate compound.

18. The process of claim 1, wherein the metal within said multi-component water soluble metal compound is selected from the group consisting of Fe, Cu, Ni, Cr, Mn, Ti, Mo, Co, W, and combinations thereof.

19. The process of claim 1, wherein said water-soluble metal compound comprises an iron sulfate compound, an iron nitrate compound, an iron ammonium sulfate compound, or an iron halide compound.

20. The process of claim 18, wherein said water-soluble metal compound $FeSO_4$, $FeCl_2$, $Fe(NH_4)_2(SO_4)_2$, $FeCl_3$, $Fe_2(SO_4)_3$, $Fe(C_2O_4)$, $Fe_2(C_2O_4)_3$, $Fe(NO_3)_2$, $Fe(NO_3)_3$, $Fe_2(SO_4)_3$ or $FeNH_4(SO_4)_2$ and their hydrates.

21. The process of claim 18, wherein said water-soluble metal compound is used in combination with $CuX_2$, $NiX_2$, $CoX_2$, $CrX_3$, $MoX_3$ where X is Cl, Br, I, $ClO_4$, or $NO_3$; CuY, NiY, CoY where Y is $SO_4$, or $C_2O_4$; $M_2MOO_4$, $M_2CrO_4$, $M_2WCrO_4$ where M is $NH_4$, Li, Na, or K.

22. The process of claim 18, wherein said water-soluble metal compound is used in combination with $TiCl_3$, titanous acid, molybdic acid, tungstic acid, chromic acid, potassium permanganate and their hydrates.

23. A process of producing nanometer-sized particles of an iron oxide compound, comprising the steps of:

forming a reverse micelle system or a bi-continuous system each comprising a polar fluid, a surfactant and a co-surfactant that is an alkyl sulfate in a non-polar or low-polarity fluid;

introducing a first reactant comprising a multi-component, water soluble iron compound into the polar fluid during the formation of said reverse micelle system or said bi-continuous system subsequent to its formation;

reacting said multi-component, water soluble iron compound in said reverse micelle system or said bi-continuous system to form particles of said nanometer sized iron oxide compound; and separating said nanometer-sized particles from said reverse micelle system or said bi-continuous system.

24. The process of claim 23, wherein said water soluble iron compound is selected from the group consisting of iron sulfate, iron nitrate, iron ammonium sulfate, iron halide, hydrates thereof and combinations thereof.

25. The process of claim 23, wherein an additional reactant is selected from the group, consisting of $NH_3$, $Na_2S$, $NH_4OH$, $O_2$, $KOH$, $H_2S$, $CO_2$, $H_2CO_3$, $NaHCO_3$, $KHCO_3$, $Na_2CO_3$, $K_2CO_3$, $HCl$, $H_2SO_4$, $H_3PO_4$, $H_2NaPO_4$, $HNa_2PO_4$, $HNa_3PO_4$, $HK_2PO_4$, $H_2KPO_4$, $K_3PO_4$, $(NH_4)_2S$, and combinations thereof.

26. The process of claim 23, wherein said surfactant is selected from the group consisting of cetyl trimethyl ammonium bromide, dodecyl penta(oxyethylene) ether, n-dodecyloctaoxyethylene glycol monoether, sodium bis (2-ethyl hexyl) sulfosuccinate, didodecyl-dimethylammonium bromide and combinations thereof.

27. The process of claim 23, wherein said alkyl sulfate has from 8 to 20 carbon atoms.

28. The process of claim 27, wherein said alkyl sulfate is sodium alkyl sulfate.

29. A process of producing nanometer-sized particles of a metal compound, comprising the steps of:

forming a reverse micelle system or a bi-continuous system, or a reverse microemulsion system each comprising a polar fluid, a surfactant and a co-surfactant that is water soluble in a non-polar or low-polarity fluid;

introducing a first reactant comprising a multi-component, water soluble metal compound into the polar fluid during the formation of said reverse micelle system or said bi-continuous system subsequent to its formation;

reacting said multi-component, water soluble metal compound in said reverse micelle system or said bi-continuous system to form said nanometer sized particles of said nanometer-sized metal compound selected from the group consisting of $Fe(OH)_3$ alpha-FeOOH, alpha-$Fe_2O_3$, beta-$Fe_2O_3$, gamma-$Fe_2O_3$, magnetite, maghemite, beta-FeOOH, FeS, $Fe_2S_3$, FeOS, $NH_4FeS_2$ and mixtures thereof ; and separating said nanometer-sized particles from said reverse micelle system or said bi-continuous system.

30. The process of claim 29, wherein said water soluble metal compound is selected from the group of iron sulfate, iron nitrate, iron ammonium sulfate, and iron halide.

31. The process of claim 29, further comprising the step of:

adding at least one additional reactant.

32. The process of claim 31, wherein said additional reactant is selected from the group consisting of $NH_3$, $NaOH$, $Na_2S$, $NH OH$, $O_2$, $KOH$, $H_2S$, $K_2S$, $CO_2$, $H_2CO_3$, $NaHCO_3$, $KHCO_3$, $Na_2CO_3$, $K_2CO_3$, $HCl$, $H_2SO_4$, $H_3PO_4$, $H_2NaPO_4$, $HN_2PO_4$, $Na_3PO_4$, $HK_2PO_4$, $H_2KPO_4$, $K_3PO4l$ $(NH_4)_2S$, and combinations thereof.

33. The process of claim 29, wherein said polar fluid is water.

34. The process of claim 29, wherein said surfactant comprises cetyl trimethyl ammonium bromide, dodecyl penta oxyethylene ether, n-dodecyloctaoxyethylene glycol monoether, sodium bis(2-ethyl hexyl) sulfosuccinate, or didodecyldimethylammonium bromide.

35. The process of claim 29, wherein said co-surfactant comprises sodium alkyl sulfate having from 8 to 20 carbon atoms.

36. The process of claim 29, wherein said nanometer-sized particles have an average size not more than about 20 nm.

37. The process of claim 29, wherein said reacting step further includes removing water from said reverse micelles or said reverse microemulsion.

38. The process of claim 29, wherein said reacting step further includes raising or lowering a pH of said multi-component water soluble metal compound.

39. The process of claim 29, wherein said reacting step further includes introducing a capping reagent into said reverse micelle or reverse microemulsion system.

40. The process of claim 39, wherein said capping agent comprises a primary sulfide, an alcohol, a thioalcohol, a phenol or a thiophenol.

41. The process of claim 29, wherein said first reactant is a water soluble sulfate, nitrate, halide, ammonium sulfate or oxalate compound.

42. The process of claim 29, wherein said water soluble metal compound comprises $CuX_2$, $NiX_2$, $CoX_2$, $CrX_2$, $MoX_2$, where X is Cl, Br, I, $ClO_4$, or $No_3$; CuY, NiY, CoY, where Y is $SO_4$ or $C_2O_4$; $M_2MoO_4$, $M_2CrO_4$, $M_2WCrO_4$, where M is $NH_4$, Li, Na, or K; $TiCl_3$, titanous acid, molybdic acid, tungstic acid, chromic acid, potassium permanganate or their hydrates.

* * * * *